US007227797B2

(12) United States Patent
Thayer et al.

(10) Patent No.: US 7,227,797 B2
(45) Date of Patent: *Jun. 5, 2007

(54) HIERARCHICAL MEMORY CORRECTION SYSTEM AND METHOD

(75) Inventors: Larry Jay Thayer, Ft. Collins, CO (US); Michael Kennard Tayler, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 67 days.

This patent is subject to a terminal disclaimer.

(21) Appl. No.: 11/215,107

(22) Filed: Aug. 30, 2005

(65) Prior Publication Data

US 2007/0047344 A1 Mar. 1, 2007

(51) Int. Cl.
*G11C 7/00* (2006.01)
(52) U.S. Cl. ...................... 365/201; 365/200
(58) Field of Classification Search ............ 365/201, 365/200, 189.08, 230.03
See application file for complete search history.

(56) References Cited

U.S. PATENT DOCUMENTS

| 6,243,845 | B1 * | 6/2001 | Tsukamizu et al. ......... 714/769 |
| 6,493,843 | B1 | 12/2002 | Raynham |
| 6,715,116 | B2 | 3/2004 | Lester et al. |
| 6,785,835 | B2 | 8/2004 | MacLaren et al. |
| 6,845,472 | B2 | 1/2005 | Walker et al. |
| 6,883,131 | B2 | 4/2005 | Acton |
| 6,918,007 | B2 | 7/2005 | Chang et al. |
| 2004/0225943 | A1 | 11/2004 | Brueggen |
| 2004/0225944 | A1 | 11/2004 | Brueggen |
| 2005/0027891 | A1 | 2/2005 | Emmot et al. |
| 2005/0071554 | A1 | 3/2005 | Thayer et al. |
| 2005/0080958 | A1 | 4/2005 | Handgen et al. |
| 2005/0160329 | A1 | 7/2005 | Briggs et al. |

OTHER PUBLICATIONS

"IBM Chipkill Memory—Advanced ECC Memory for the IBM Netfinity 7000 M10"; IBM; pp. 1-6.
"White Paper: Understanding RAID"; http://www.ossi.net/raid/php; pp. 1-5.
Locklear, David; "Chipkill Correct Memory Architecture"; Dell; Technology Brief; Aug. 2000; pp. 1-4.
"RAID Technology White Paper"; Acer; Jul. 2001; pp. 1-19.
Dipert, Brian; "Banish bad memories"; www.ednmag.com; Nov. 22, 2001; pp. 61-72.
Persson, Jimmy et al.; "RAID Systems"; Blekinge Institute of Technology, Sweden, Research Paper, Oct. 12, 2002; pp. 1-10.

* cited by examiner

*Primary Examiner*—Richard T. Elms
*Assistant Examiner*—Hien N Nguyen (57) ABSTRACT

A hierarchical error correction system and method operable with a computer memory system. In one embodiment, the memory system comprises a plurality of memory modules organized as a number of error correction code (ECC) domains, wherein each ECC domain includes a set of memory modules, each memory module comprising a plurality of memory devices. A first error correction engine is provided for correcting device-level errors associated with a specific memory device and a second error correction engine for correcting errors at a memory module level, wherein the first and second error correction engines are operable in association with a memory controller operably coupled to the plurality of memory modules.

27 Claims, 5 Drawing Sheets

FIG. 5B

HIERARCHICAL MEMORY CORRECTION SYSTEM AND METHOD

INCORPORATION BY REFERENCE TO CO-PENDING APPLICATIONS

This application incorporates by reference the following co-pending commonly owned U.S. patent applications: (i) "SYSTEMS AND METHODS FOR PROVIDING ERROR CORRECTION CODE TESTING FUNCTIONALITY," application Ser. No. 10/435,149, filed May 9, 2003, in the name(s) of: Christopher M. Brueggen (U.S. Patent Application Publication No. 2004/0225943; published Nov. 11, 2004); (ii) "SYSTEMS AND METHODS FOR PROCESSING AN ERROR CORRECTION CODE WORD FOR STORAGE IN MEMORY COMPONENTS," application Ser. No. 10/435,150, filed May 9, 2003, in the name(s) of: Christopher M. Brueggen (U.S. Patent Application Publication No. 2004/0225944; published Nov. 11, 2004); (iii) "RAID MEMORY SYSTEM," application Ser. No. 10/674,262, filed Sep. 29, 2003, in the name(s) of: Larry Thayer, Eric McCutcheon Rentschler and Michael Kennard Tayler (U.S. Patent Application Publication No. 2005/0071554; published Mar. 31, 2005); and (iv) "MEMORY CORRECTION SYSTEM AND METHOD," application Ser. No. 11/214,697, filed Sep.30, 2005, in the name(s) of: Larry Thayer.

BACKGROUND

Electronic data storage utilizing commonly available memories (such as Dynamic Random Access Memory or DRAM) can be problematic. Specifically, there is a finite probability that, when data is stored in memory and subsequently retrieved, the retrieved data will suffer some corruption. For example, DRAM stores information in relatively small capacitors that may suffer a transient corruption due to a variety of mechanisms, e.g., charged particles or radiation (i.e., soft errors). Additionally, data corruption may occur as the result of hardware failures such as loose memory modules, blown chips, wiring defects, and/or the like. The errors caused by such failures are often referred to as repeatable errors, since the same physical mechanism repeatedly causes the same pattern of data corruption.

To address this problem, a variety of error detection and error correction algorithms have been developed. In general, error detection algorithms typically employ redundant data added to a string of data. The redundant data is calculated utilizing a checksum or cyclic redundancy check (CRC) operation. When the string of data and the original redundant data is retrieved, the redundant data is recalculated utilizing the retrieved data. If the recalculated redundant data does not match the original redundant data, data corruption in the retrieved data is detected.

Error correction code (ECC) algorithms operate in a manner similar to error detection algorithms. When data (or, payload) is stored, redundant data is calculated and stored in association with the data. When the data and the redundant data are subsequently retrieved, the redundant data is recalculated and compared to the retrieved redundant data. When an error is detected (e.g, the original and recalculated redundant data do not match), the original and recalculated redundant data may be used to correct certain categories of errors.

Although current ECC solutions are known to be generally effective in addressing certain types of memory errors, higher levels of reliability are constantly being pursued in the design of memory systems.

DETAILED DESCRIPTION OF THE DRAWINGS

A hierarchical error correction scheme operable with a memory system is set forth hereinbelow. In one embodiment, the memory system comprises a plurality of memory modules organized as a number of ECC domains, wherein each ECC domain includes a set of memory modules, each memory module comprising a plurality of memory devices. A first error correction engine is provided for correcting device-level errors associated with a specific memory device and a second error correction engine for correcting errors at a memory module level, wherein the first and second error correction engines are operable in association with a memory controller operably coupled to the plurality of memory modules.

Figure 1:
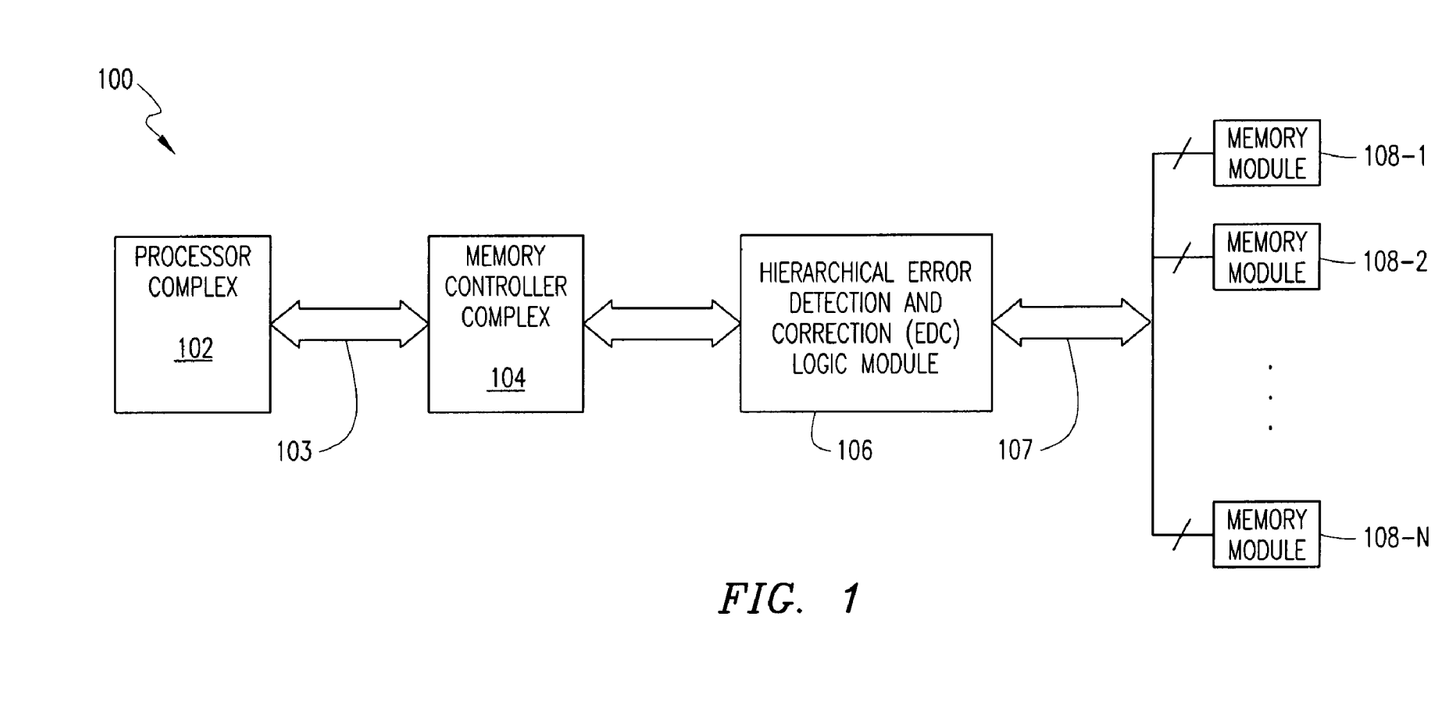
FIG. 1 is a block diagram of an exemplary computer system wherein a hierarchical memory error correction scheme may be practiced according to one embodiment.

Representative embodiments of the present patent disclosure will now be described with reference to various examples wherein like reference numerals are used throughout the description and several views of the drawings to indicate like or corresponding parts, and further wherein the various elements are not necessarily drawn to scale. Referring to FIG. 1, depicted therein is a block diagram of an exemplary computer system 100 wherein a hierarchical memory error detection and correction system and method may be practiced according to one embodiment. A processor complex 102 comprises any number of processors, with known or heretofore unknown types, hardware designs and architectures, et cetera, that are operably coupled to a memory controller complex 104 via a generalized interconnect topology 103 for purposes of effectuating memory operations in association therewith. Those skilled in the art should recognize that the interconnect topology 103 may involve one or more appropriate host bus segments, crossbar connections, bus-to-bus bridges, and/or other electronic circuitry, which are selected depending on the architectural scheme of the computer system. The memory controller complex 104, which may include any number of memory controllers, is operably associated with one or more hierarchical error detection/correction (EDC) modules 106 to detect and correct multiple-level errors with respect to a plurality of memory modules 108-1 through 108-N that form at least a portion of a memory subsystem of the computer system 100. As will be set forth in detail below, the hierarchical EDC module 106 may be implemented in hardware, software, firmware, or in any combination thereof, and may be integrated within the memory controller complex 104 for correcting chip-level (or, device-level) memory failures as well as module-level failures that may occur concurrently within the memory subsystem.

In one exemplary implementation, the memory controller complex 104 and associated hierarchical EDC module 106 may be operably coupled to the memory modules 108-1 through 108-N via any suitable interconnect topology 107 to form a memory system, wherein the interconnect topology 107 allows for the practice of the teachings set forth herein without regard to data bus widths (i.e., different data word sizes including redundant data for error correction), data bus segmentation, bandwidth capacities, clock speeds, etc., except the requirement that the interconnect topology 107 be preferably adaptable to operate with a variable number of memory modules that may be hierarchically organized into a number of logical levels. Conceptually, an embodiment of the hierarchical memory organization is envisioned to comprise at the lowest level a plurality of individual memory devices (not shown) that are grouped into a number of memory modules, e.g., memory modules 108-1 through 108-N, which in turn may be arranged as a plurality of ECC domains wherein each ECC domain includes a set of memory modules. Clearly, additional and/or alternative levels of hierarchical organization may be implemented in other arrangements. Regardless, the logic associated with the EDC module 106 is operable to isolate memory errors at each level (e.g., a chip-level error that may render an entire memory device inoperable, or a module-level error that may render an entire memory module inoperable), and apply suitable level-specific error correction engines that correct the multi-level errors in order to improve memory system reliability.

Figure 2:
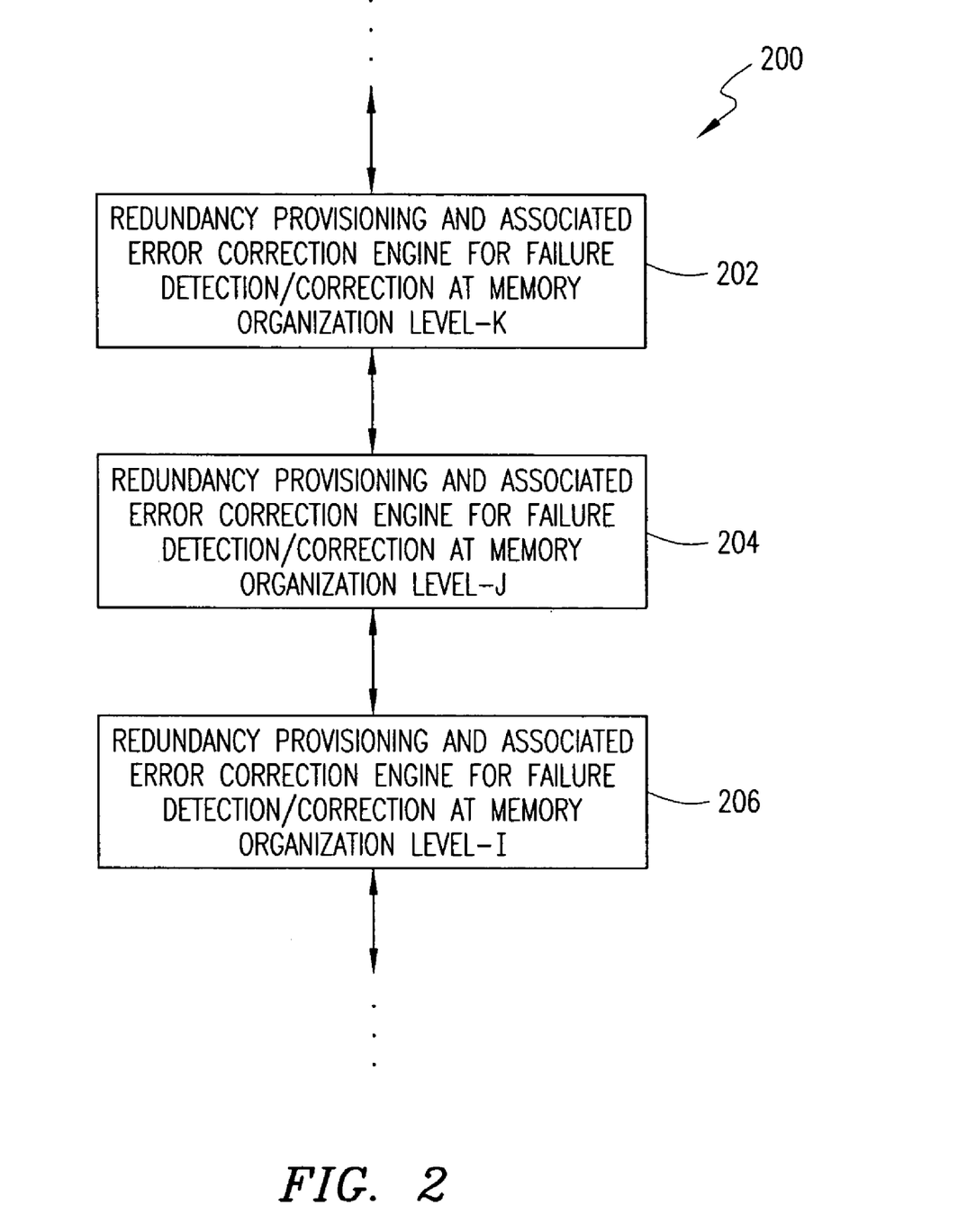
FIG. 2 illustrates an error correction hierarchy operable with a memory system.

FIG. 2 illustrates an error correction hierarchy and associated methodology 200 operable with a memory system such as the computer memory system described above. As depicted, the methodology 200 involves multiple levels of redundancy provisioning so that failures at a particular level may be detected and corrected accordingly. At each hierarchical level of memory organization, an error correction logic block or engine is provided as part of the overall methodology 200, which may be implemented in association with one or more memory controllers as alluded to hereinabove. By way of illustration, block 202 refers to redundancy provisioning and associated error correction engine for failure detection/correction at Level-K, e.g., a higher level, of an exemplary hierarchical memory organization. Likewise, blocks 204 and 206 refer to redundancy provisioning and associated error correction engines operable at Level-J and Level-I, respectively, that comprise lower levels in the exemplary hierarchical memory organization. For instance, a chip-level redundancy and associated error correction engine may be provided in association with a memory controller for correcting various errors that may afflict a lower hierarchical level in a memory system, e.g., single-bit errors, multi-bit errors, or errors that incapacitate an entire memory device or at least a portion thereof, using any known or heretofore unknown ECC methodologies and algorithms, such as chip-kill correct (i.e., chip spare) and chip erasure techniques, etc. In similar fashion, a module-level redundancy and associated error correction engine may be provided in association with the memory controller for correcting higher level errors in the memory system, e.g., errors that give rise to failure of an entire module, or even an entire ECC domain, for instance. These teachings will now be set forth in further detail with respect to particular representative embodiments of a memory system as exemplified hereinbelow.

Figure 3:
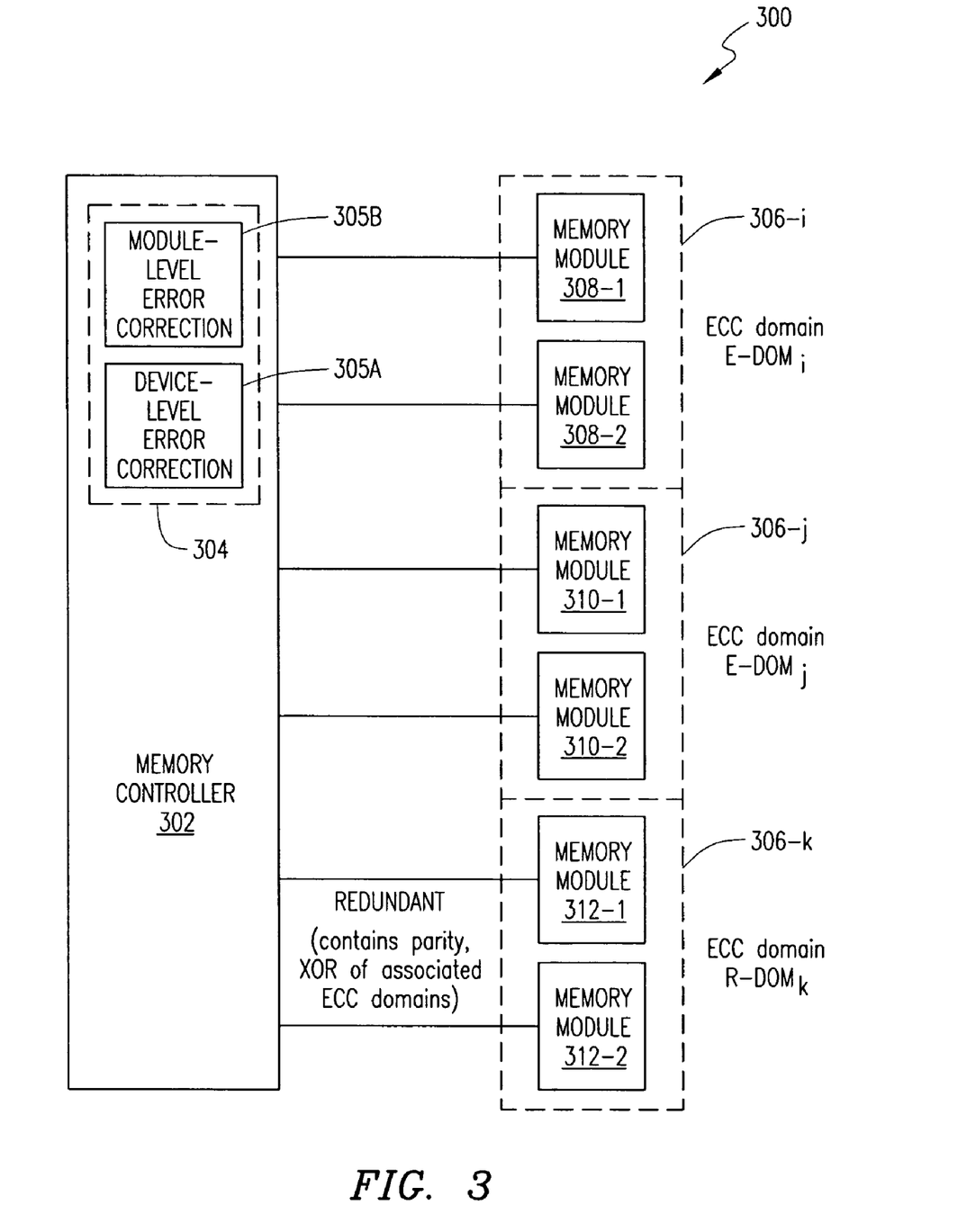
FIG. 3 is a block diagram of an exemplary memory system having a plurality of memory modules arranged in a number of ECC domains wherein module-level errors may be corrected as part of an embodiment of the hierarchical memory error correction scheme.

Referring now to FIG. 3, depicted therein is a block diagram of an exemplary memory system 300 having a plurality of memory modules arranged in a number of ECC domains wherein module-level errors may be corrected in accordance with an embodiment of the hierarchical memory correction scheme of the present patent disclosure. A memory controller 302 includes an EDC block 304 which comprises a device-level error correction engine 305A and a module-level error correction engine 305B. In some exemplary implementations, memory controller 302 may comprise some of the memory controller arrangements shown in the following co-pending commonly owned U.S. patent applications: (i) "SYSTEMS AND METHODS FOR PROVIDING ERROR CORRECTION CODE TESTING FUNCTIONALITY," application Ser. No. 10/435,149, filed May 9, 2003, in the name(s) of: Christopher M. Brueggen; (ii) "SYSTEMS AND METHODS FOR PROCESSING AN ERROR CORRECTION CODE WORD FOR STORAGE IN MEMORY COMPONENTS," application Ser. No. 10/435,150, filed May 9, 2003, in the name(s) of: Christopher M. Brueggen; and (iii) "RAID MEMORY SYSTEM," application Ser. No. 10/674,262, filed Sep. 29, 2003, in the name(s) of: Larry Thayer, Eric McCutcheon Rentschler and Michael Kennard Tayler, incorporated by reference hereinabove.

For purposes of one embodiment of the present patent disclosure, six memory modules 308-1, 308-2, 310-1, 310-2, 312-1, 312-2, are exemplified that are arranged as three pairs, wherein a pair of memory modules is operated as a particular ECC domain. Those skilled in the art should recognize that although only six memory modules are shown, there may be more than six modules in other embodiments. Additionally, there may be other arrangements with a plurality of ECC domains wherein more than two memory modules or portions thereof (i.e., a set of modules) are operated as a single ECC domain. Furthermore, a memory module may be generalized as a grouping of memory devices that are physically and/or logically treated as a single unit by the memory controller 302. Thus, where pair-based ECC domains are provided (i.e., a pair of memory modules defining each ECC domain), for a given P memory modules, P being an even number, the total number of ECC domains are P/2. In accordance with one embodiment of the present patent disclosure, module-level redundancy is provided with respect to ECC data storage (wherein each ECC word or sub-word includes a predetermined number of data bits as well as a predetermined number of ECC bits depending on memory system design and applicable ECC technique) such that for a set of ECC domains (e.g., a pair of ECC domains) there is provided an ECC domain that is operated as a redundancy domain associated therewith. For instance where a redundant domain is provided for a pair of ECC domains, if the total number of ECC domains is P/2, then 2/3 of the ECC domains may be used for ECC-added data storage and the remaining 1/3 of the domains may be used as the redundancy domains (i.e., 2:1 ratio between the data storage domains and their corresponding redundancy domains) respectively associated therewith. Accordingly, reference numerals 306-$i$ and 306-$j$ refer to two exemplary ECC domains operable as data storage domains which include memory module pairs 308-1/308-2 and 310-1/310-2 (labeled as E-DOM$_i$ and E-DOM$_j$, respectively). Further, the redundant ECC domain is labeled as R-DOM$_k$ 306-$k$ which contains parity data based on XORing of the contents of E-DOM$_i$ 306-$i$ with the contents of E-DOM$_j$ 306-$j$. An XOR engine or circuit (not explicitly shown in FIG. 3) is therefore operable to effectuate the following processing with respect to data storage in the memory system 300:

$$R\text{-}DOM_k = E\text{-}DOM_i \oplus E\text{-}DOM_j$$

wherein the symbol denotes the bit-wise Exclusive-OR operation performed with respect to the set of ECC domains, e.g., E-DOM$_i$ and E-DOM$_j$ domains.

Because of the module-level redundancy provided in the memory system architecture by way of XOR circuitry, similar circuitry may be used as a module-level error correction engine for recovering data from an ECC domain that is known to be faulty. For example, if the data in a module of the domain E-DOM$_j$ 306-$j$ is determined to be faulty or corrupted for some reason, that data may be recovered by an XOR engine operable to effectuate the following processing:

$$\text{Corr}\{E\text{-}DOM_j\} = E\text{-}DOM_i \oplus R\text{-}DOM_k$$

which can be executed independent of any lower level ECC processing for correcting errors that may concurrently occur elsewhere in the memory system 300 of FIG. 3. Further, even where an entire ECC domain becomes faulty, that domain's data can be restored using the same technique.

One skilled in the art will recognize upon reference hereto that XOR engines described above may be embodied as a single module, e.g., module-level error correction module 305B, associated with the memory controller 302, although they may implemented as separate circuits as well. As a further generalization, it should be realized that if the number of ECC data storage domains is M, then the maximum number of ECC domain pairs between which XOR processing may be effectuated will be:

$$\text{Max}\{\text{Number of XOR pairs}\} = {}^M C_r = M!/r!(M-r)!$$

where r=2. However, not all XOR pairs need to be processed and stored (which would be prohibitively ineffective) for purposes of providing module-level redundancy in accordance with the teachings of the present disclosure. In fact, where the number of ECC data storage domains, M, is an even number, then M/2 of XOR pairs (thus, M/2 redundant domains) will be sufficient for providing complete module-level redundancy. On the other hand, to optimize storage, an expected rate of module failure may also be taken into account. That is, for example, if x number of modules are expected to fail and if the system is to recover from all x failing modules, then 2x redundant modules need to be provisioned.

A more generalized treatment of the above concept may be appreciated as follows regardless of the number of memory modules per ECC domain. To correct N bits with 100% certainty, one would need about 2N redundant bits. Thus, within an ECC domain, two spare DRAM devices may be provided (one per each module) to correct up to one failing DRAM. Also, in similar fashion, two redundant memory modules may be provided to correct any failing module. Accordingly, a number of implementations are possible, e.g., one data module with two redundant modules; two data modules with two redundant modules; four data modules with two redundant modules; six data modules with two redundant modules, etc., each implementation with the capability to correct any one failing memory module.

Figure 4:
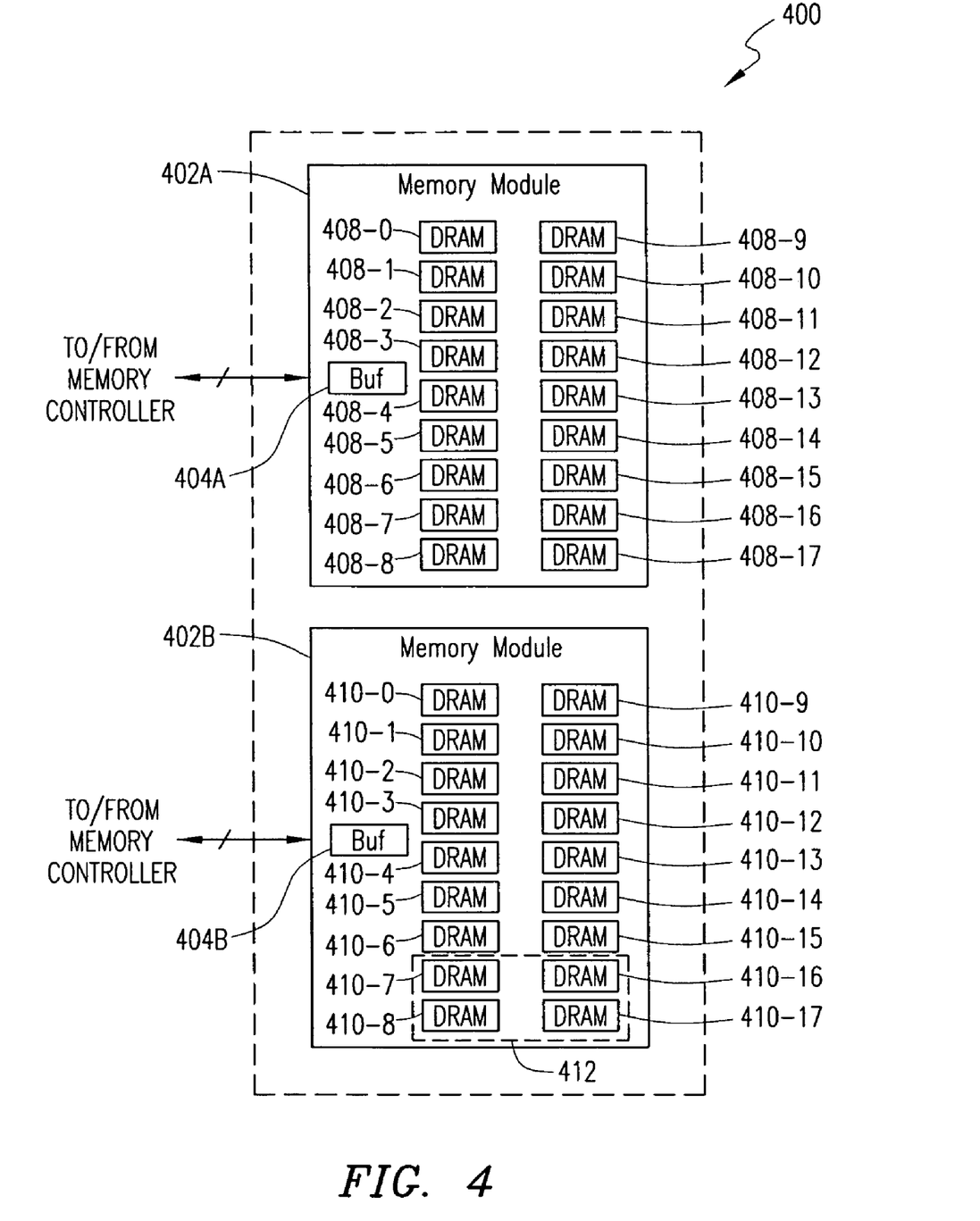
FIG. 4 is a block diagram of an exemplary ECC domain having a plurality of memory devices or chips wherein chip-level errors may be corrected as part of an embodiment of the hierarchical memory error correction scheme.

As to errors that may afflict individual memory devices, e.g., DRAM chips, within the memory modules of the memory system 300, any known or heretofore unknown ECC technique may be implemented that is operable at the device level of a particular memory organization. FIG. 4 illustrates a block diagram of an exemplary ECC domain 400 having a plurality of memory devices wherein chip-level errors may be corrected as part of an embodiment of the hierarchical memory error correction scheme of the present patent disclosure. As alluded to before, it is a common requirement of ECC memory that some bits of an ECC word be dedicated to actual data (data width) and other bits to ECC depending on memory system design and ECC implementation. Accordingly, in the ECC domain 400, which may be provided to operate as the ECC domains of the memory system 300 of FIG. 3 in one embodiment, an ECC word of 144 bits (data width of 128 bits plus 16 bits dedicated to ECC) is realized by providing 36 DRAM chips (each contributing 4 bits of output, i.e., x4 DRAM), which are organized into two modules 402A and 402B, each comprising 18 DRAM devices. Each module 402A, 402B therefore contributes a 72-bit chunk of the ECC word, that is buffered through a respective buffer 404A, 404B. Reference numerals 408-0 through 408-17 refer to the 18 DRAM devices of the memory module 402A. Likewise, reference numerals 410-0 through 410-17 refer to the 18 DRAM devices of the memory module 402B. It should be recognized that the internal arrangement of the individual memory modules 404A, 402B (i.e., bus topologies and how the DRAM devices are coupled to the respective buffers, and the like) is irrelevant for purposes of the present disclosure, and therefore not dealt with in this patent disclosure. Likewise, details concerning particular DRAM implementations such as data output width, e.g., x4, x8, or x16, etc., may also be deemed immaterial for device-level error correction purposes of the representative embodiments set forth herein. Additionally, although the buffers 404A, 404B are shown to be within respective memory modules in FIG. 4, there is no such requirement, however. In fact, in other exemplary embodiments, the buffers 404A and 404B may be provided as a separate block that is independent from the memory modules themselves.

As pointed out earlier, the exemplary ECC arrangement associated with the memory domain 400 involves 16 bits of redundancy (i.e., equivalent to the output of four x4 DRAM devices) which may be localized in a particular subset of the memory devices of the ECC domain, or distributed or scattered anywhere in the two memory modules 402A, 402B. For purposes of illustration, four DRAMs 410-7, 410-8, 410-16 and 410-17 are highlighted to represent the amount of ECC/redundant data as a redundancy block 412 in FIG. 4, although it should be recognized that the redundant data may be spread throughout the memory modules. The exact distribution or localization of the redundant data within the ECC memory domain 400 is dependent on the specific ECC algorithm or methodology implemented therein, which is not particularly critical for purposes of the present patent application.

By way of example, representative embodiments of the ECC domain 400 may utilize a suitable Reed-Solomon burst error correction algorithm to effectuate byte correction capability. In Reed-Solomon algorithms, the code word comprises n m-bit numbers: $C = (c_{(n-1)}, c_{(n-2)}, \ldots, c_{(0)})$. The ECC word may be represented mathematically by the following polynomial of degree n with the coefficients (symbols) being elements in the finite Galois field ($2^m$):

$$C(x) = \{c_{(n-1)} x^{(n-1)} + c_{(n-2)} x^{(n-2)} + c_{(n-3)} x^{(n-3)} \ldots + c_{(0)}\}$$

The ECC code word is generated utilizing a generator polynomial (typically denoted by g (x)). Specifically, the payload data (denoted by u(x)) is multiplied by the generator polynomial for systematic coding, wherein the original payload bits (i.e., actual data bits) are caused to appear explicitly in defined positions of the code word. The original payload bits are represented by $[x^{(n-k)}u(x)]$ and the redundancy information is represented by $[x^{(n-k)}u(x) \bmod \{g(x)\}]$.

When the ECC code word (e.g., a 72-bit or 144-bit code word) is subsequently retrieved from memory, the retrieved code word may suffer data corruption due to a transient failure and/or a repeatable failure. The retrieved code word may be represented by the polynomial r(x). If r(x) includes data corruption, r(x) differs from C(x) by an error signal e(x). The redundancy information is recalculated from the retrieved ECC code word. Subsequently, the original redundancy information as stored in memory and the newly calculated redundancy information are combined utilizing an XOR operation to form what is known as the syndrome polynomial s(x) which is also related to the error signal. Using this relationship, several algorithms are operable to determine the error signal and thus correct the errors in the corrupted data represented by r(x). For example, these techniques include error-locator polynomial determination, root finding for determining the positions of error(s), and error value determination for determining the correct bit-pattern of the error(s). Additional details regarding the implementation of a byte error correction algorithm coupled with data scattering may be found in one or more of following co-pending commonly owned U.S. patent applications: (i) "SYSTEMS AND METHODS FOR PROVIDING ERROR CORRECTION CODE TESTING FUNCTIONALITY," application Ser. No. 10/435,149, filed May 9, 2003, in the name(s) of: Christopher M. Brueggen; and (ii) "SYSTEMS AND METHODS FOR PROCESSING AN ERROR CORRECTION CODE WORD FOR STORAGE IN MEMORY COMPONENTS," application Ser. No. 10/435,150, filed May 9, 2003, in the name(s) of: Christopher M. Brueggen, each of which has been incorporated by reference hereinabove.

Furthermore, capabilities such as chip-kill correct techniques and chip erasure techniques may also be implemented at the device level hierarchy using related ECC algorithms and methodologies. Exemplary chip-kill correct techniques allow a memory system, e.g., memory system 300 shown in FIG. 3, to withstand a multi-bit failure within a DRAM device, including a failure that causes incorrect data on all data bits of the device. Likewise, chip erasure techniques take advantage of the fact that erasures in ECC words comprise specific bits or specific strings of bits that are known to be corrupted without resorting to the ECC functionality. For example, specific bits may be identified as being corrupted due to a hardware failure such as a malfunctioning DRAM component, a wire defect, and/or the like. Introduction of erasures into an ECC algorithm is advantageous, at least in part because the positions of the erased bits are known. As set forth in one or more of the incorporated references, let d represent the minimum distance of a code, v represent the number of errors, and p represent the number of erasures contained in a received ECC code word. Then, the minimum Hamming distance between code words is reduced to at least $(d-\mu)$ in the non-erased portions. It follows that the error-correcting capability is $[(d-\mu-1)/2]$ and the following relation is maintained: $(d>2v+\mu)$. Specifically, this inequality demonstrates that for a fixed minimum distance, it is twice as "easy" to correct an erasure as it is to correct a randomly positioned error.

In one representative embodiment, the ECC algorithm of a memory controller may implement the decoding procedure of a [36, 33, 4] shortened narrow-sense Reed-Solomon code (where the code word length is 36 symbols, the payload length is 33 symbols, and the Hamming distance is 4 bits) over a finite Galois field ($2^8$) that defines the symbol length to be 8 bits. By adapting the ECC algorithm in this manner, the ECC algorithm may perform both randomly located single-byte correction as well as erasure correction which may involve correction of known multi-byte failures.

Those skilled in the art should recognize that in additional and/or alternative embodiments, other ECC algorithms such as, e.g., Bose-Chaudhuri-Hocquenghem (BCH) codes, Reed-Muller codes, binary Golay codes and Goppa codes, etc., may also be implemented for purposes of error correction at the device level in accordance with the teachings set forth herein. Accordingly, a device level error correction engine implemented within an embodiment of the hierarchical memory error correction scheme of the present disclosure is envisioned to comprehend all such ECC engines, including chip-kill correct and chip erasure capabilities in certain arrangements.

Figure 5A:
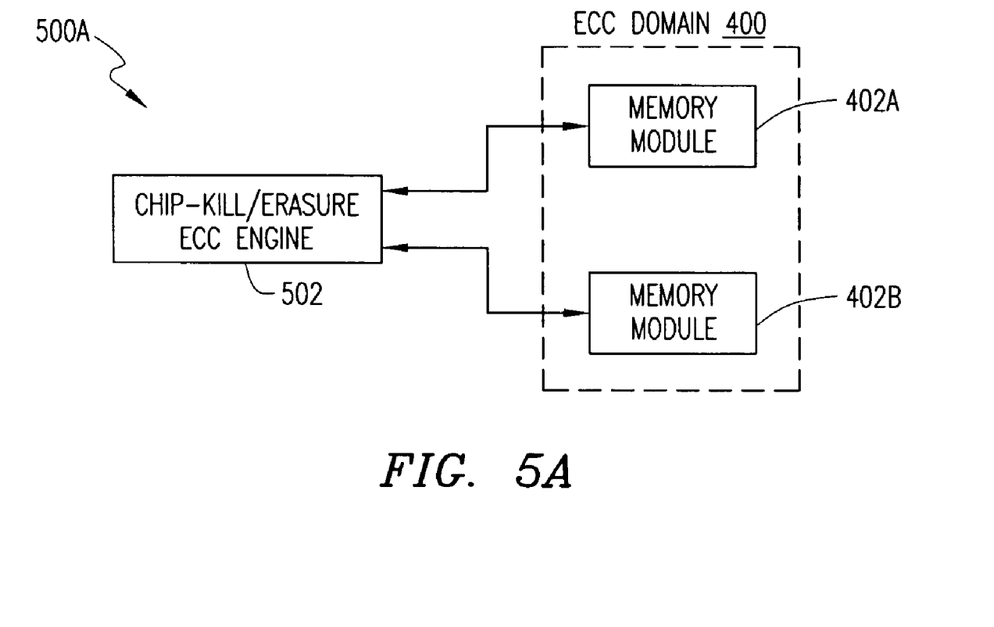
FIGS. 5A and 5B depicts two exemplary error correction engines operable at different hierarchical levels for facilitating correction of multiple-level memory failures in a computer system.
Figure 5B:
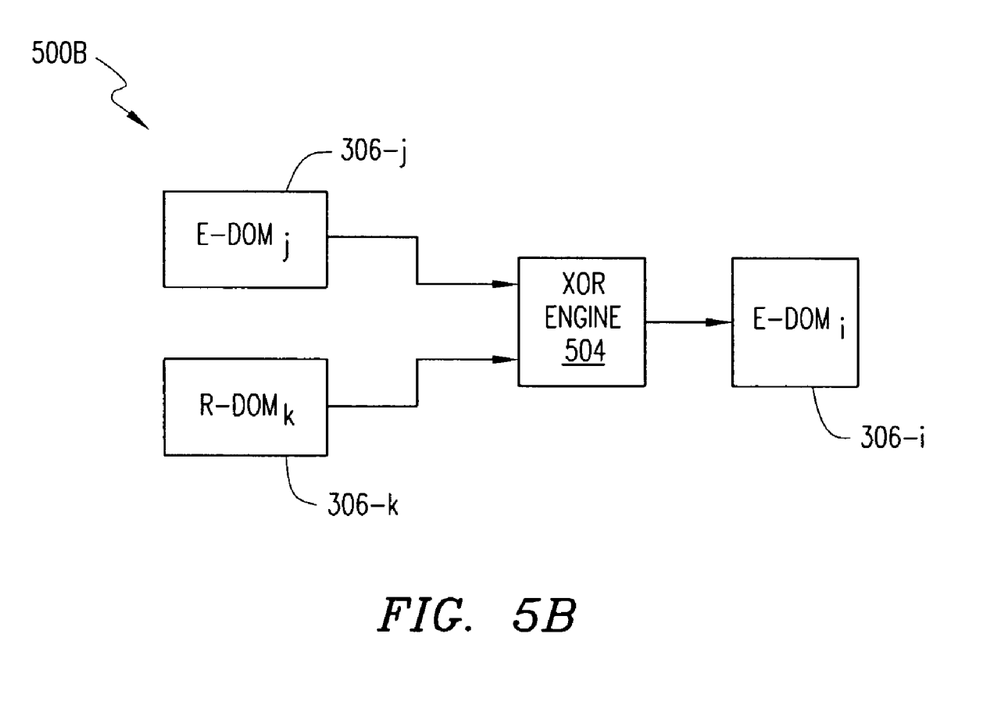

FIGS. 5A and 5B depict two exemplary error correction engines operable at different hierarchical levels for facilitating correction of multiple-level memory failures in a computer system as set forth hereinabove. Reference numeral 500A refers to a device-level correction scheme wherein an ECC/chip-kill/erasure engine 502 is provided for correcting device-specific failures within a particular ECC domain, e.g., ECC domain 400 which includes the memory module pair 402A, 402B. Reference numeral 500B refers to a module-level correction scheme wherein an XOR engine 504, which may include one or more XOR engines, is operable to correct module-level failures by restoring data in a faulty module (e.g., E-DOM$_i$ 306-$i$) as described previously. Each of the error correction schemes may be operated independent of the other in an exemplary memory system, whereby reliability may be significantly enhanced.

Although the invention has been described with reference to certain exemplary embodiments, it is to be understood that the forms of the invention shown and described are to be treated as illustrative only. Accordingly, various changes, substitutions and modifications can be realized without departing from the scope of the present invention as set forth in the following claims.

What is claimed is:

1. A memory system, comprising:
a plurality of memory modules organized as a number of error correction code (ECC) domains, wherein each ECC domain includes a set of memory modules, each memory module comprising a plurality of memory devices;
a first error correction engine for correcting device-level errors associated with a specific memory device; and
a second error correction engine for correcting errors at a memory module level, wherein said first and second error correction engines are operable in association with a memory controller operably coupled to said plurality of memory modules.

2. The memory system as recited in claim 1, wherein said each ECC domain comprises a specified amount of redundant data in said set of memory modules thereof, said redundant data for use by said first error correction engine for correcting device-level errors associated with a specific memory device of said ECC domain.

3. The memory system as recited in claim 2, wherein said specified amount of redundant data is distributed among said plurality of memory devices forming said each EGG domain.

4. The memory system as recited in claim 1, wherein at least one of said ECC domains is operable as a redundant domain associated with a particular set of ECC domains, said redundant domain having parity data obtained based on contents of said particular set of ECC domains.

5. The memory system as recited in claim 4, wherein said second error correction engine is operable to use said parity data in said redundant domain for correcting a module-level failure that renders inoperable at least one memory module of said particular set of ECC domains.

6. The memory system as recited in claim 4, wherein said second error correction engine is operable to use said parity data in said redundant domain for correcting a domain-level failure that renders inoperable one of said particular set of ECC domains.

7. The memory system as recited in claim 1, wherein said first error correction engine comprises an ECC engine based on a chip spare algorithm.

8. The memory system as recited in claim 1, wherein said first error correction engine comprises an ECC engine based on a chip erasure algorithm.

9. The memory system as recited in claim 1, wherein said second error correction engine comprises an Exclusive-OR (XOR) engine.

10. The memory system as recited in claim 1, wherein said each ECC domain includes a pair of memory modules.

11. A memory correction method operable with a memory system comprising a plurality memory modules organized as a number of error correction code (ECC) domains, wherein each ECC domain includes a set of memory modules, each memory module having a plurality of memory devices, said method comprising:
  providing a first error correction engine for correcting device-level errors associated with a specific memory device of an ECC domain, said ECC domain comprising an amount of redundant data for use by said first error correction engine; and
  providing a second error correction engine for correcting errors at a module level based on parity data in a redundant domain associated with a particular set of ECC domains.

12. The memory correction method as recited in claim 11, wherein said amount of redundant data is distributed among said plurality of memory devices forming said ECC domain.

13. The memory correction method as recited in claim 11, wherein said amount of redundant data is localized within a particular subset of said plurality of memory devices forming said ECC domain.

14. The memory correction method as recited in claim 11, wherein said second error correction engine is operable to use said parity data in said redundant domain for correcting a modulelevel failure that renders inoperable at least one memory mbdule of said particular set of ECC domains.

15. The memory correction method as recited in claim ii, wherein said second error correction engine is operable to use said parity data in said redundant domain for correcting a domain-level failure that renders inoperable one of said particular set of ECC domains.

16. The memory correction method as recited in claim 11, wherein said first error correction engine comprises an ECC engine based on a chip spare algorithm.

17. The memory correction method as recited in claim 11, wherein said first error correction engine comprises an ECC engine based on a chip erasure algorithm.

18. The memory correction method as recited in claim 11, wherein said second error correction engine comprises an Exclusive-OR (XOR) engine.

19. A computer system, comprising;
  a processor complex operably coupled to a memory controller complex, said memory controller complex for controlling memory operations with respect to a plurality of memory modules organized as a number of error correction code (ECC) domains, wherein each ECC domain includes a set of memory modules, each memory module comprising a plurality of memory devices;
  a first error correction engine for correcting device-level errors associated with a specific memory device of an EGO domain, said EGO domain comprising an amount of redundant data foruse by said first error correction engine; and
  a second error correction engine for correcting errors at a module level based on parity data in a redundant domain associated with a particular set of ECC domains, wherein said first and second error correction engines are operable in association with said memory controller complex operably coupled to said plurality of memory modules.

20. The computer system as recited in claim 19, wherein said amount of redundant data is distributed among said plurality of memory devices forming said ECC domain.

21. The computer system as recited in claim 19, wherein said amount of redundant data is localized within a particular subset of said plurality of memory devices forming said ECC domain.

22. The computer system as recited in claim 19, wherein said second error correction engine is operable to use said parity data in said redtrndant domain for correcting a modulelevel failure that renders inoperable at least one memory module of said particular set of ECG domains.

23. The computer system as recited in claim 19, wherein said second error correction engine is operable to use said parity data in said redundant domain for correcting a domain-level failure that renders inoperable one of said particular set of ECC domains.

24. The computer system as recited in claim 19, wherein said first error correction engine comprises an ECC engine based on a chip spare algorithm.

25. The computer system as recited in claim 19, wherein said first error correction engine comprises an ECC engine based on a chip erasure algorithm.

26. The computer system as recited in claim 19, wherein said second error correction engine comprises an Exclusive-OR (XOR) engine.

27. The computer system as recited in claim 19, wherein said each ECC domain includes a pair of memory modules.

* * * * *

UNITED STATES PATENT AND TRADEMARK OFFICE
CERTIFICATE OF CORRECTION

PATENT NO. : 7,227,797 B2
APPLICATION NO. : 11/215107
DATED : June 5, 2007
INVENTOR(S) : Larry Jay Thayer et al.

It is certified that error appears in the above-identified patent and that said Letters Patent is hereby corrected as shown below:

In column 5, line 6, delete "$R\text{-}DOM_k = E\text{-}DOM_i \ E\text{-}DOM_j$" and insert -- $R\text{-}DOM_k = E\text{-}DOM_i \oplus E\text{-}DOM_j$ --, therefor.

In column 5, line 20, delete "$Corr\{E\text{-}DOM_j\} = E\text{-}DOM_i \ R\text{-}DOM_k$" and insert -- $Corr\{E\text{-}DOM_j\} = E\text{-}DOM_i \oplus R\text{-}DOM_k$ --, therefor.

In column 9, line 3, in Claim 3, delete "EGG" and insert -- ECC --, therefor.

In column 9, line 56, in Claim 14, delete "modulelevel" and insert -- module-level --, therefor.

In column 9, line 57, in Claim 14, delete "mbdule" and insert -- module --, therefor.

In column 9, line 58, in Claim 15, after "claim" delete "ii" and insert -- 11 --, therefor.

In column 10, line 21, in Claim 19, before "domain," delete "EGO" and insert -- ECC --, therefor.

In column 10, line 21, in Claim 19, after "said" delete "EGO" and insert -- ECC --, therefor.

In column 10, line 22, in Claim 19, delete "foruse" and insert -- for use --, therefor.

In column 10, line 41, in Claim 22, delete "redtrndant" and insert -- redundant --, therefor.

UNITED STATES PATENT AND TRADEMARK OFFICE
CERTIFICATE OF CORRECTION

PATENT NO. : 7,227,797 B2
APPLICATION NO. : 11/215107
DATED : June 5, 2007
INVENTOR(S) : Larry Jay Thayer et al.

It is certified that error appears in the above-identified patent and that said Letters Patent is hereby corrected as shown below:

In column 10, lines 41-42, in Claim 22, delete "modulelevel" and insert -- module-level --, therefor.

In column 10, line 43, in Claim 22, delete "ECG" and insert -- ECC --, therefor.

Signed and Sealed this

Twelfth Day of August, 2008

JON W. DUDAS
*Director of the United States Patent and Trademark Office*